J. COHN.

Metallic Corner-Clasps for Boxes.

No. 5,782. Reissued March 10, 1874.

*Witnesses:*

A. L. McIntire.

Jacob Felbel

*Inventor:*

Joseph Cohn

By his attorney

J. McIntire

UNITED STATES PATENT OFFICE.

JOSEPH COHN, OF NEW YORK, N. Y.

IMPROVEMENT IN METALLIC CORNER-CLASPS FOR BOXES.

Specification forming part of Letters Patent No. 121,156, dated November 21, 1871; reissue No. 5,782, dated March 10, 1874; application filed February 11, 1874.

DIVISION B.

*To all whom it may concern:*

Be it known that I, JOSEPH COHN, of the city, county, and State of New York, have invented a new and useful Metallic Corner-Clasp to be used as corner-pieces in the manufacture of all sorts of paper and pasteboard boxes; and I do hereby declare the following to be such a full, clear, and exact description thereof, as will enable those skilled in the art to make and use the same, reference being had to the accompanying drawings forming part of this specification, and in which drawing—

Figure 1:
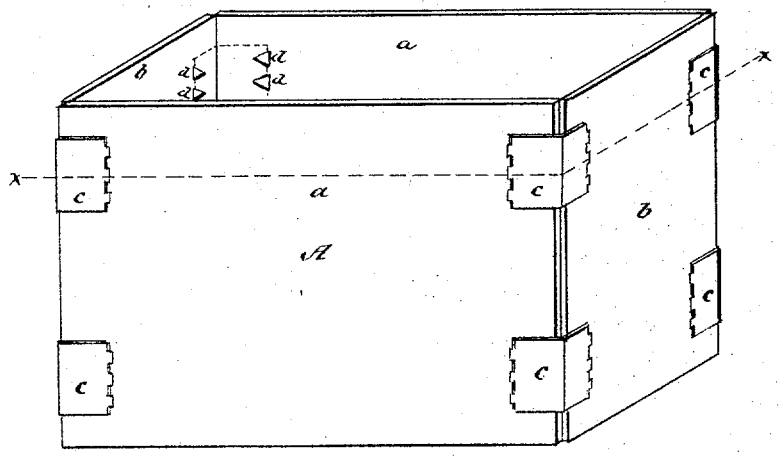
Figure 2:
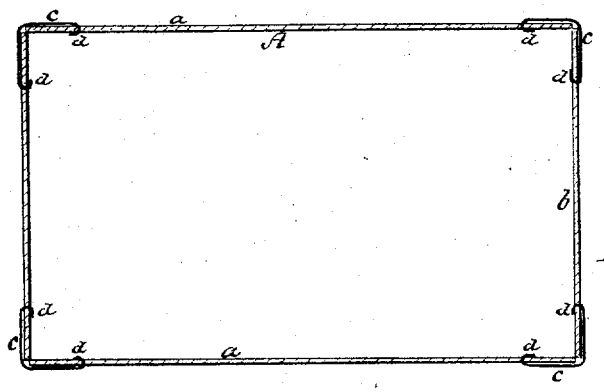
Figure 3:
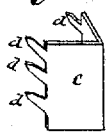
Figure 4:
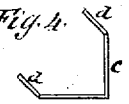

Figure 1 represents, in perspective view, a pasteboard box having applied to it, in the process of manufacture, my metallic box-clasps or corner-pieces. Fig. 2 is a horizontal section at the line *x x*, Fig. 1, showing more clearly how the clasps are upset or clinched on the inside of the box. Fig. 3 is a perspective view (increased scale) of one of my box-clasps or corner-pieces, and Fig. 4 is a cross-section (same scale) of said clasp.

Similar letters designate the same parts in the several figures.

Previous to my invention the giving away at the corners of boxes, such as used for the package of all sorts of manufactured articles and goods, has been a source of great inconvenience to the manufacturer, merchant, and purchaser of goods in box packages, and various efforts have been made in the manufacture of such boxes to overcome this evil.

I have provided a new and efficient means consisting in the employment of metallic clasps, adapted to be readily inserted and secured, and which, while conforming to the contour of the finished box, serve to so tie together and unite the parts of the box as to render the corners the strongest (instead of as heretofore the weakest) parts of the whole box.

In another application filed simultaneously with this I have fully described and claimed this improvement in the boxes.

The invention made the subject of this application consists in a sheet-metal clasp or corner-piece adapted in its body to conform to the angle of the box to which it is to be applied, and formed with points or spurs adapted to enter the sides of the box, and by means of which it may be secured, substantially as will be hereinafter more fully described.

In the accompanying drawings, A represents an ordinary pasteboard box, having applied to its corners my metal corner-clasps, as seen at *c*. The spurs or points *d* of this clasp pass through the material of which the box is composed, and are clinched on the inside, as clearly seen at *d*, Fig. 2.

The clasp *c* is formed of sheet metal, bent or otherwise shaped to conform to the angle or shape of the corner of the box to which it is to be applied, and it is formed, as shown, with points or spurs *d*, which are so shaped as to readily enter the material of the box or holes made therein, and admit of being clinched, as shown, and which (spurs) are so located or arranged about parallel with each other that they can all enter or penetrate simultaneously the box material, and so that in clinching they shall not interfere with each other.

The length, number of spurs, and exterior design or appearance of the clasp may, of course, be varied infinitely without departing from my invention, so long as the clasp contains the characteristic features of construction described, adapting it for the intended purpose set forth.

Having so fully explained my invention that any one skilled in the art can make and use my metallic corner-clasp for boxes, what I claim as new, and desire to secure by Letters Patent, is—

A sheet-metal corner-clasp, bent or otherwise formed to conform to the angle or shape of the corners, and provided with spurs or points adapted to penetrate and be clinched upon the sides, substantially as and for the purpose set forth.

In testimony whereof I have hereunto set my hand and seal this 10th day of January, 1874.

JOSEPH COHN. [L. S.]

In presence of—
A. ASCHER,
JACOB FELBEL.